(12) United States Patent
Kim et al.

(10) Patent No.: US 11,724,391 B2
(45) Date of Patent: Aug. 15, 2023

(54) METHOD AND APPARATUS FOR DETERMINING STATUS OF A ROBOT

(71) Applicant: SK ENPULSE CO., LTD., Gyeonggi-do (KR)

(72) Inventors: Nam In Kim, Gyeonggi-do (KR); Jin Sung Park, Gyeonggi-do (KR); Keun Young Song, Gyeonggi-do (KR); In Cheol Kim, Seoul (KR); Byoung Guk Seo, Chungcheongnam-do (KR); Il Sung Kim, Gyeonggi-do (KR); Soung Sun Park, Gyeonggi-do (KR); Ei Sam Jeong, Gyeonggi-do (KR)

(73) Assignee: SK ENPULSE CO., LTD., Gyeonggi-Do (KR)

( * ) Notice: Subject to any disclaimer, the term of this patent is extended or adjusted under 35 U.S.C. 154(b) by 272 days.

(21) Appl. No.: 17/349,286

(22) Filed: Jun. 16, 2021

(65) Prior Publication Data

US 2021/0387339 A1 Dec. 16, 2021

(30) Foreign Application Priority Data

Jun. 16, 2020 (KR) ........................ 10-2020-0072793

(51) Int. Cl.
  *B25J 9/16* (2006.01)
  *H02P 21/00* (2016.01)
  (Continued)

(52) U.S. Cl.
  CPC .............. *B25J 9/1653* (2013.01); *B25J 9/163* (2013.01); *B25J 13/088* (2013.01); *H02P 21/50* (2016.02); *H02P 23/14* (2013.01)

(58) Field of Classification Search
  CPC ........ B25J 9/1653; B25J 9/163; B25J 13/088; B25J 9/1674; B25J 9/1602; H02P 21/50;
  (Continued)

(56) References Cited

U.S. PATENT DOCUMENTS

2015/0287625 A1   10/2015  Fujimoto et al.
2022/0099633 A1*   3/2022  Sato ........................ G01N 29/46
2023/0055678 A1*   2/2023  Sato ..................... H04B 17/309

FOREIGN PATENT DOCUMENTS

CA         2833416 A1 *  5/2014  ......... G01R 19/2513
JP    2008-011682 A       1/2008
(Continued)

*Primary Examiner* — Bickey Dhakal
(74) *Attorney, Agent, or Firm* — The PL Law Group, PLLC (57) ABSTRACT

A method for determining the status of a robot according to an embodiment includes acquiring first data and second data related to an operation of the robot, acquiring a resonance frequency by analyzing the operation of the robot in a frequency region based on the first data related to the operation of the robot, acquiring a first comparison result by comparing the acquired resonance frequency with a reference resonance frequency, when the first comparison result is a threshold value or more, generating a Lissajous figure by DQ transforming a three-phase signal based on the second data related to the operation of the robot, acquiring a second comparison result by comparing the generated Lissajous figure with a reference Lissajous figure, and determining the status of the robot based on at least one of the first comparison result and the second comparison result.

16 Claims, 6 Drawing Sheets

(51) Int. Cl.
*B25J 13/08* (2006.01)
*H02P 23/14* (2006.01)

(58) Field of Classification Search
CPC ......... H02P 23/14; G06F 17/14; H02N 2/008; H04R 1/2869
See application file for complete search history.

(56) References Cited

FOREIGN PATENT DOCUMENTS

| | | | | |
|---|---|---|---|---|
| JP | 2011-176922 | A | 9/2011 | |
| JP | 2019-058998 | A | 4/2019 | |
| JP | 2019-063882 | A | 4/2019 | |
| JP | 2019-101009 | A | 6/2019 | |
| KR | 2000-0011017 | U | 6/2000 | |
| KR | 10-1883885 | B1 | 8/2018 | |
| RU | 2709749 | C1 * | 12/2019 | |
| WO | WO-2019017222 | A1 * | 1/2019 | ............ H02M 5/458 |

* cited by examiner

METHOD AND APPARATUS FOR DETERMINING STATUS OF A ROBOT

CROSS-REFERENCE TO RELATED APPLICATION(S)

This application claims priority to Korean Patent Application No. 10-2020-0072793 filed on Jun. 16, 2020 in the Korean Intellectual Property Office (KIPO), the entire disclosure of which is incorporated by reference herein.

BACKGROUND

1. Field

The technical idea of the present disclosure relates to a method and an apparatus for determining the status of a robot, and more particularly, to a method and an apparatus for determining the status of a robot through frequency analysis and DQ transform analysis.

2. Description of the Related Art

With the progress of techniques in hardware and software, the application range of robot-related techniques have been now expanded from industrial robots to household robots, service robots, medical robots and the like. Recently, with the development of artificial intelligence, networks, big data, and deep learning techniques, the application range of robot techniques has been growing wider. As such, as the application range of robots is widened, problems related to maintenance of robots may occur. More specifically, there is an increasing need to determine a status of a robot and predict a life-time of the robot for maintenance of the robot.

According to the prior art, in order to determine the status of a robot, the robot, that is, the equipment should be stopped, and a separate diagnosis process should be performed using special equipment or tools. In addition, even if performing such a process, there is no objective indicator for determining the status of the robot, such that it is difficult to objectively determine the current status of the robot or predict the life-time of the robot.

Accordingly, more objective and accurate methods and apparatuses for determining the status of a robot are required.

SUMMARY

According to the technical idea of the present disclosure, it is a technical problem of the present disclosure to provide a method and an apparatus for determining the status of a robot, which are capable of more objectively and accurately determining the status of the robot.

The technical problem to be achieved by the method and apparatus for determining the status of a robot according to the technical idea of the present disclosure is not limited to the problems described above, and other problems not described above will be clearly understood by those skilled in the art from the following descriptions.

According to an aspect of the technical idea of the present disclosure, there is provided a method for determining the status of a robot, the method including: acquiring first data and second data related to an operation of the robot; acquiring a resonance frequency by analyzing the operation of the robot in a frequency region based on the first data related to the operation of the robot; acquiring a first comparison result by comparing the acquired resonance frequency with a reference resonance frequency; when the first comparison result is a threshold value or more, generating a Lissajous figure by DQ transforming a three-phase signal based on the second data related to the operation of the robot; acquiring a second comparison result by comparing the generated Lissajous figure with a reference Lissajous figure; and determining the status of the robot based on at least one of the first comparison result and the second comparison result.

According to an exemplary embodiment, the first data related to the operation of the robot may include data on a torque of a motor, a velocity and a position of a driving unit related to the operation of the robot.

According to an exemplary embodiment, the step of acquiring at least one resonance frequency by analyzing the operation of the robot in the frequency region may include: performing fast Fourier transform (FFT) on a torque change of the motor related to the operation of the robot on the basis of data on the torque of the motor related to the operation of the robot to acquire at least one resonance frequency component for the operation of the robot.

According to an exemplary embodiment, the step of acquiring at least one resonance frequency by analyzing the operation of the robot in the frequency region may include determining a section to perform the FFT with respect to the torque change of the motor related to the operation of the robot on the basis of data on the velocity and position of the driving unit related to the operation of the robot.

According to an exemplary embodiment, the step of determining the status of the robot may include determining the status of the robot in an operation process of the robot on the basis of data on the velocity and position of the driving unit related to the operation of the robot.

According to an exemplary embodiment, the second data related to the operation of the robot may include data on a three-phase current or voltage input to the motor related to the operation of the robot.

According to an exemplary embodiment, the step of DQ transforming the three-phase signal to generate the Lissajous figure may include DQ transforming the three-phase current or voltage input to the motor related to the operation of the robot to acquire a d-axis component and a q-axis component; and generating a Lissajous figure based on the acquired d-axis component and the q-axis component.

According to an exemplary embodiment, the method may further include updating the reference resonance frequency through iterative learning for the operation of the robot.

According to another aspect of the technical idea of the present disclosure, there is provided an apparatus for determining the status of a robot, the apparatus including: a data acquisition unit configured to acquire first data and second data related to an operation of the robot; and a status determination unit configured to acquire a resonance frequency by analyzing the operation of the robot in a frequency region based on the first data related to the operation of the robot, acquire a first comparison result by comparing the acquired resonance frequency with a reference resonance frequency, when the first comparison result is a threshold value or more, generate a Lissajous figure by DQ transforming a three-phase signal based on the second data related to the operation of the robot, acquire a second comparison result by comparing the generated Lissajous figure with a reference Lissajous figure, and determine the status of the robot based on at least one of the first comparison result and the second comparison result.

According to an exemplary embodiment, the first data related to the operation of the robot may include data on a torque of a motor, a velocity and a position of a driving unit related to the operation of the robot.

According to an exemplary embodiment, the status determination unit may perform fast Fourier transform (FFT) on a torque change of the motor related to the operation of the robot on the basis of data on the torque of the motor related to the operation of the robot to acquire at least one resonance frequency component for the operation of the robot.

According to an exemplary embodiment, the status determination unit may determine a section to perform the FFT with respect to the torque change of the motor related to the operation of the robot on the basis of data on the velocity and position of the driving unit related to the operation of the robot.

According to an exemplary embodiment, the status determination unit may determine the status of the robot in an operation process of the robot on the basis of data on the velocity and position of the motor related to the operation of the robot.

According to an exemplary embodiment, the second data related to the operation of the robot may include data on a three-phase current or voltage input to the motor related to the operation of the robot.

According to an exemplary embodiment, the status determination unit may DQ transform the three-phase current or voltage input to the motor related to the operation of the robot to acquire a d-axis component and a q-axis component, and generate a Lissajous figure based on the acquired d-axis component and the q-axis component.

According to an exemplary embodiment, the data acquisition unit may update the reference resonance frequency through iterative learning for the operation of the robot.

In accordance of the method and apparatus for determining the status of a robot according to embodiments of the technical idea of the present disclosure, it is possible to more objectively and accurately determine the status of the robot.

Effects which may be acquired by the method and apparatus for determining the status of a robot according to the technical idea of the present disclosure are not limited to the above-mentioned effects, and other effects not mentioned herein will be clearly understood by persons having common knowledge in the technical field to which the present disclosure pertains from the following descriptions.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Since the technical idea of the present disclosure may have various changes and various embodiments, specific embodiments will be illustrated in the drawings and described in detail. However, it is not intended to limit the technical idea of the present disclosure to the specific embodiments, and it should be understood by those skilled in the art that the present invention includes all changes, equivalents, or substitutes included in the scope of the technical idea of the present disclosure.

In the description of the technical idea of the present disclosure, the publicly known functions and configurations related to the present disclosure, which are judged to be able to make the purport of the present invention unnecessarily obscure will not be described in detail. In addition, numbers (e.g., first, second, etc.) used in the description process of the present disclosure are only identification symbols for distinguishing one component from other components.

Further, in the present disclosure, it should be understood that when a component is referred to as being "connected to" or "coupled to" another component, the component can be "directly connected to" or "directly coupled to" the another component, but they can be directly connected or coupled to each other through another component in the middle, unless there is a description opposite thereto.

In addition, terms such as "-unit," "-device," "-member," "-module," and the like described in the present disclosure refer to a unit to execute at least one function or operation, which may be implemented by hardware or software such as a processor, a microprocessor, micro controller, central processing unit (CPU), graphics processing unit (GPU), accelerate processor unit (APU), digital signal processor (DSP), application specific integrated circuit (ASIC), field programmable gate array (FPGA), or a combination of hardware and software.

In addition, a division of the configuration units in the present disclosure is intended for ease of description and divided only by the main function set for each configuration unit. That is, two or more of the configuration units to be described below may be combined into a single configuration unit or formed by two or more of divisions by function into more than a single configuration unit. Further, each of the configuration units to be described below may additionally perform a part or all of the functions among functions set for other configuration units other than being responsible for the main function, and a part of the functions among the main functions set for each of the configuration units may be exclusively taken and certainly performed by other configuration units.

Figure 1:
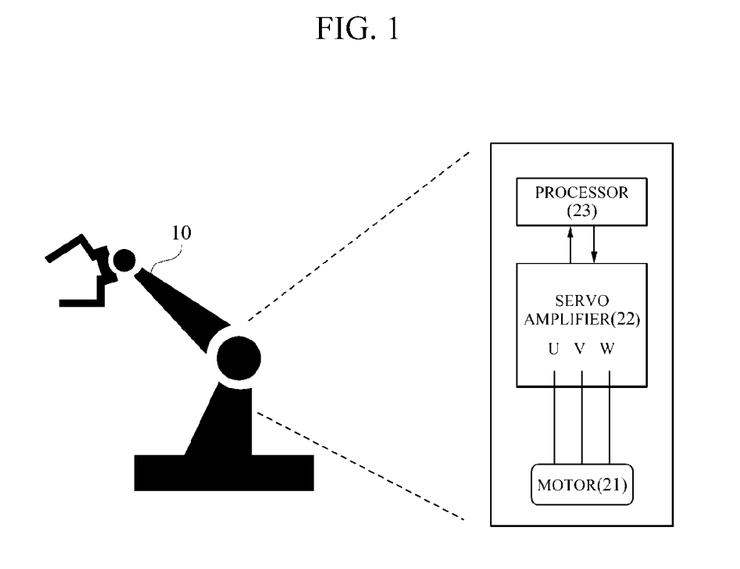
FIG. 1 is a view for describing an operation process of a robot.

Hereinafter, embodiments according to the technical idea of the present disclosure will be described in detail in turn. FIG. 1 is a view for describing an operation process of the robot.

FIG. 1 discloses an articulated robot 10 and internal configurations thereof as an example of a robot. The articulated robot 10 may include a motor 21, a servo amplifier 22 for supplying a power to the motor 21 and a processor 23.

The motor 21 functions to receive the power through the servo amplifier 22 and transform an electrical energy into a kinetic energy. In one embodiment, the motor 21 may be connected with a drive shaft of the articulated robot 10 to provide the kinetic energy so that the articulated robot 10 can be operated. The articulated robot 10 may have a plurality of drive shafts, and one motor 21 may correspond to each drive shaft or to the plurality of drive shafts.

The processor 23 may control an entire operation of the articulated robot 10. More specifically, by adjusting the power supplied to the motor 21 through the servo amplifier 22, it is possible to control whether the motor 21 rotates, a rotation direction and a rotation velocity thereof, etc.

Figure 2:
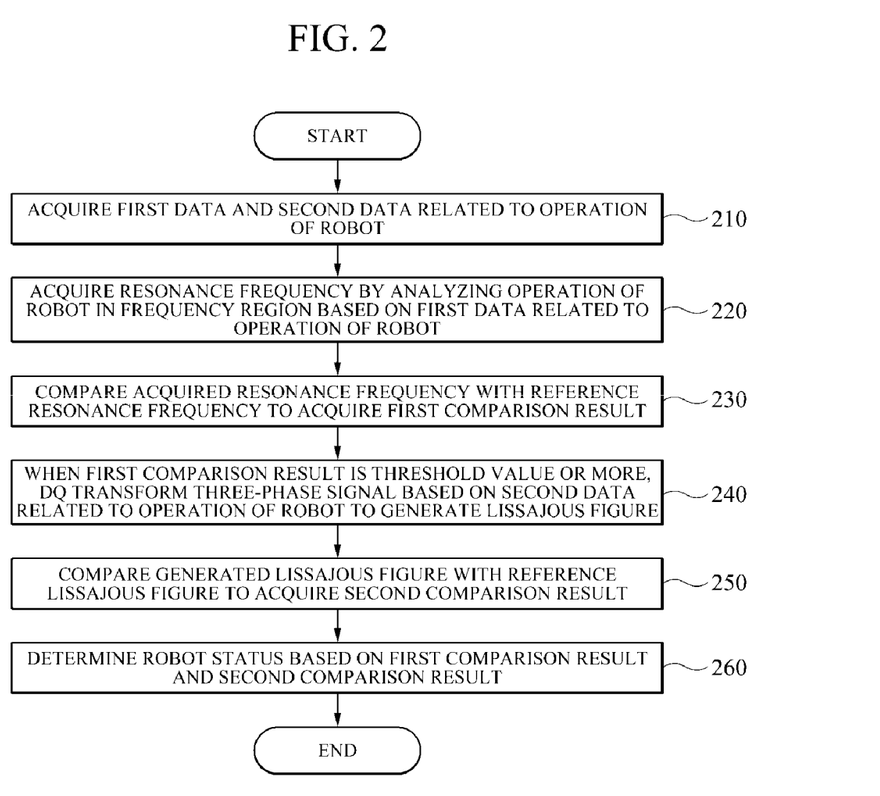
FIG. 2 is a flowchart illustrating a method for determining the status of a robot (hereinafter, also referred to as a 'robot status determination method') according to an embodiment of the technical idea of the present disclosure.

FIG. 2 is a flowchart illustrating a robot status determination method according to an embodiment of the technical idea of the present disclosure.

First, in step 210, the robot status determination apparatus acquires first data and second data related to an operation of the robot. Herein, the operation of the robot may include a motion according to the driving of the robot. For example, as shown in FIG. 1, in the case of the articulated robot 10, a motion of the joint, that is, a motion of folding and unfolding the joint may be referred to as the operation of the articulated robot 10. In addition, motions such as a rotation and linear operation of the robot may also be referred to as the operation of the robot, but it is not limited thereto, and various motions according to the driving of the robot may be referred to as the operation of the robot.

In one embodiment, the first data related to the operation of the robot may include data on a torque of the motor, a velocity and a position of the driving unit, etc. related to the operation of the robot. The first data may be measured from the motor and the driving unit by sensors. For example, torque data of the motor may be acquired by measuring the torque of the motor using a torque sensor provided in the motor. In addition, velocity data of the driving unit may be acquired by measuring the velocity of the driving unit using a velocity sensor or an acceleration sensor provided in the driving unit, and position data of the driving unit may be acquired by measuring the position of the driving unit using an acceleration sensor, an optical sensor, an infrared sensor, a tilt sensor, a GPS receiver, or the like provided in the driving unit. However, the above-described sensors are only an example, and the first data may be acquired using various sensors without limitation thereof.

In one embodiment, the second data related to the operation of the robot may include data on a three-phase current or voltage input to the motor related to the operation of the robot. This second data may be measured from the motor or a power line connected to the motor by a sensor. For example, by measuring the three-phase current or voltage input to the motor using a voltmeter or an ammeter, data on the three-phase current or voltage input to the motor may be acquired.

The first data and the second data may be acquired in a preset time unit, and the robot status determination apparatus may store the acquired first data and the second data in a memory, a storage unit or the like. These first data and second data may be accumulated and stored, and the stored first data and second data may be used in a process of determining the status of a robot.

Then, in step 220, the robot status determination apparatus may acquire a resonance frequency by analyzing the operation of the robot in a frequency region based on the first data related to the operation of the robot. In one embodiment, the robot status determination apparatus may perform fast Fourier transform (FFT) on a torque change of the motor related to the operation of the robot on the basis of data on the torque of the motor related to the operation of the robot to acquire at least one resonance frequency component for the operation of the robot.

When an abnormality occurs in the driving unit or motor related to the operation of the robot, for example, when a mechanical or electrical failure such as abrasion, damage, or short circuit occurs, harmonics may occur. These harmonics may affect signals related to the operation of the robot, for example, the torque, current, voltage, power, and the like of the motor. Therefore, after performing FFT on the signals related to the operation of the robot to transform the signals to a frequency axis, a specific frequency component, for example, a resonance frequency component may be acquired and analyzed to determine the status of the robot. In one embodiment, frequency analysis may be performed based on the torque data of the motor related to the operation of the robot. The robot status determination apparatus may perform FFT on the torque change of the motor based on the torque data of the motor acquired in step 210 to acquire the resonance frequency component for the operation of the robot. The resonance frequency component for the operation of the robot may be one frequency component or may include a plurality of resonance frequency components, which will be described in more detail with reference to FIG. 3.

Figure 3:
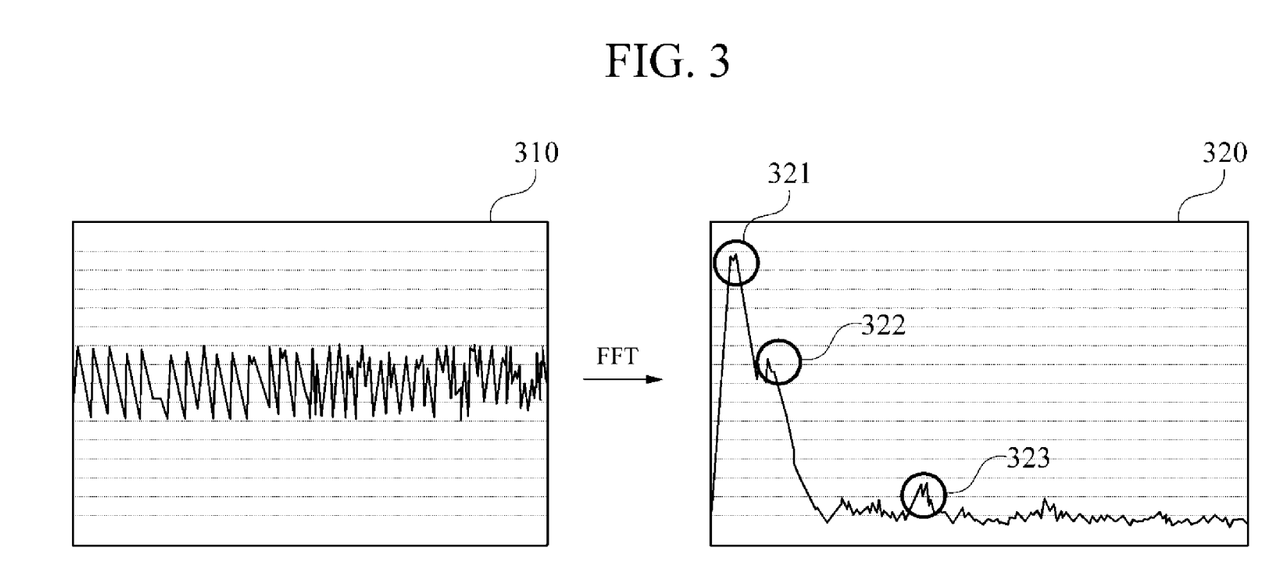
FIG. 3 is a diagram for describing a method for analyzing an operation of the robot in a frequency region according to an embodiment of the technical idea of the present disclosure.

FIG. 3 is a diagram for describing a method for analyzing an operation of the robot in the frequency region according to an embodiment of the technical idea of the present disclosure.

Referring to FIG. 3, a graph 310 is a graph illustrating the operation of the robot and the torque of the motor on a time axis, and a graph 320 is a graph illustrating the operation of the robot and the torque of the motor on a frequency axis by performing FFT on the signal of the graph 310. Referring to the graph 320, three peak values 321, 322 and 323 are shown. These peak values correspond to the resonance frequency and may indicate the status of the driving unit or motor related to the operation of the robot. For example, each of the peak values 321, 322, and 323 may indicate statuses of each of parts included in the driving unit of the robot, that is, a timing belt, a pulley, and a shaft. When an abnormality, that is, mechanical or electrical failure such as abrasion, damage, or short circuit occurs in the parts included in the driving unit of the robot, the resonance frequency of this case may appear different from the resonance frequency in the normal status.

Returning again to the description of FIG. 2, in one embodiment, when a signal changes with time, or when two or more different signals have spectra of the same frequency component, instead of the FFT, the spectrum of each signal component may also be represented over time by using time-frequency representation (TFR) methods, for example, instantaneous frequency, short-time Fourier transform, wavelet transform, Wigner distribution and the like. These time-frequency representation methods may indicate an energy density of a signal, i.e., an input signal at a specific time and frequency in three dimensions, such that a failure may be identified by measuring a degree of contribution of each failure cause to the energy distribution.

Furthermore in one embodiment, on the basis of data on the velocity and position of the driving unit related to the operation of the robot, a section to perform the FFT on the torque change of the motor related to the operation of the robot may be determined. In order to determine the status of the robot using frequency analysis, the robot status determination apparatus may compare the resonance frequency appearing in the normal operation process of the robot with the resonance frequency appearing in the current operation process (which will be described in detail again below). At this time, for accurate comparison, the operations of the robot acquiring the resonance frequencies should be the same as each other. That is, the resonance frequencies should be measured and compared in a process of performing the same motion by the robot. In other words, the robot status determination apparatus may determine the process of performing the same motion as a section to perform the FFT. When the moving velocities of the driving unit are the same as each other, and the starting positions and the ending positions of the driving unit are the same as each other, the robot status determination apparatus may determine that the robot performs the same motion. However, it is not limited thereto, and the robot status determination apparatus may determine that the robot performs the same motion using various methods.

In step 230, the robot status determination apparatus may compare the acquired resonance frequency with the reference resonance frequency to acquire a first comparison result. As described above, the resonance frequency and the reference resonance frequency may be frequencies respectively acquired in the process of performing the same motion by the robot.

In one embodiment, the reference resonance frequency may be a resonance frequency that appears in the normal operation process of the robot. The reference resonance frequency may be a reference for determining the status of the robot. In one embodiment, the frequency may be a frequency acquired based on data measured in an initial operation process of the robot, or may be a frequency acquired based on data measured in an operation process after the robot has aged. In addition, the robot status determination apparatus may update the reference resonance frequency through iterative learning for the operation of the robot.

In one embodiment, the robot status determination apparatus may determine the status of the robot based on the first comparison result. Herein, the first comparison result may appear as a difference between the acquired resonance frequency and the reference resonance frequency, and this difference may be indicated as a percentage (%), an absolute value (Hz), a frequency interval (octave) and the like. However, this is only an example, and the difference may be represented in various ways without limitation thereof.

In addition, the robot status determination apparatus may consider an error when determining the status of the robot based on the first comparison result, and an error range may be set differently depending on a frequency band. For example, a wide error range is allowed in a high frequency band and a narrow error range is allowed in a low frequency band, or conversely, a narrow error range is allowed in the high frequency band and a wide error range is allowed in the low frequency band. Further, a narrow error range may be allowed in a middle band, and wide error ranges may be allowed in the high frequency band and the low frequency band. However, this is only an example, and the error range may be set in various ways without limitation thereof.

Thereafter, in step 240, when the first comparison result is a threshold value or more, the robot status determination apparatus may DQ transform the three-phase signal based on the second data related to the operation of the robot to generate a Lissajous figure. According to an embodiment, if the first comparison result is smaller than the threshold value, the robot status determination apparatus may determine that the status of the robot is normal and end the process of determining the status of a robot. If the first comparison result is greater than the threshold value, the robot status determination apparatus may more accurately determine the status of the robot through additional analysis.

In one embodiment, the robot status determination apparatus may DQ transform the three-phase current or voltage input to the motor related to the operation of the robot to transform into a d-axis component and a q-axis component, and generate a Lissajous figure based on the d-axis component and the q-axis component, which will be described in more detail with reference to FIGS. 4 and 5.

Figure 4:
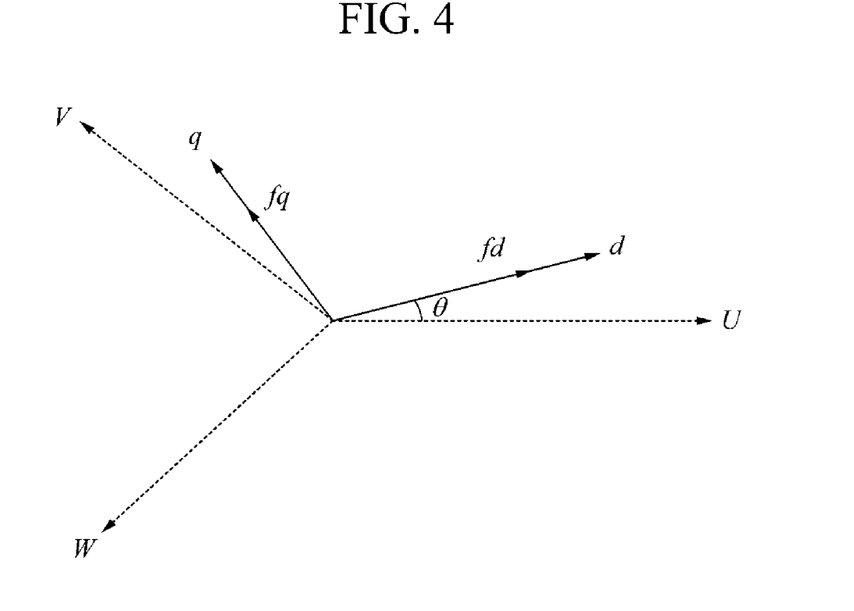
FIG. 4 is a diagram for describing a method for DQ transforming a three-phase signal according to an embodiment of the technical idea of the present disclosure.

FIG. 4 is a diagram for describing a method for DQ transforming a three-phase signal according to an embodiment of the technical idea of the present disclosure.

Referring to FIG. 4, a three-phase AC motor may rotate when U, V and W phases are periodically applied with voltage and current at an interval of 120 degrees in a sine wave. At this time, physical quantities of the motor may be represented through two variables by transforming a coordinate system represented by the U, V and W phases into a d-q-axis orthogonal coordinate system, and instantaneous control of the motor may be performed. In the d-q-axis orthogonal coordinate system, in general, the d-axis is an axis on which magnetic flux of the motor is generated, and may be selected as a direction of magnetic flux generated in the U-phase winding of a stator. Accordingly, the d-axis may be a reference axis in vector control. The q-axis is an axis orthogonal to the d-axis and may be an axis of current that generates torque in the vector control. Therefore, in the case of current control, the q-axis may be controlled.

Figure 5:
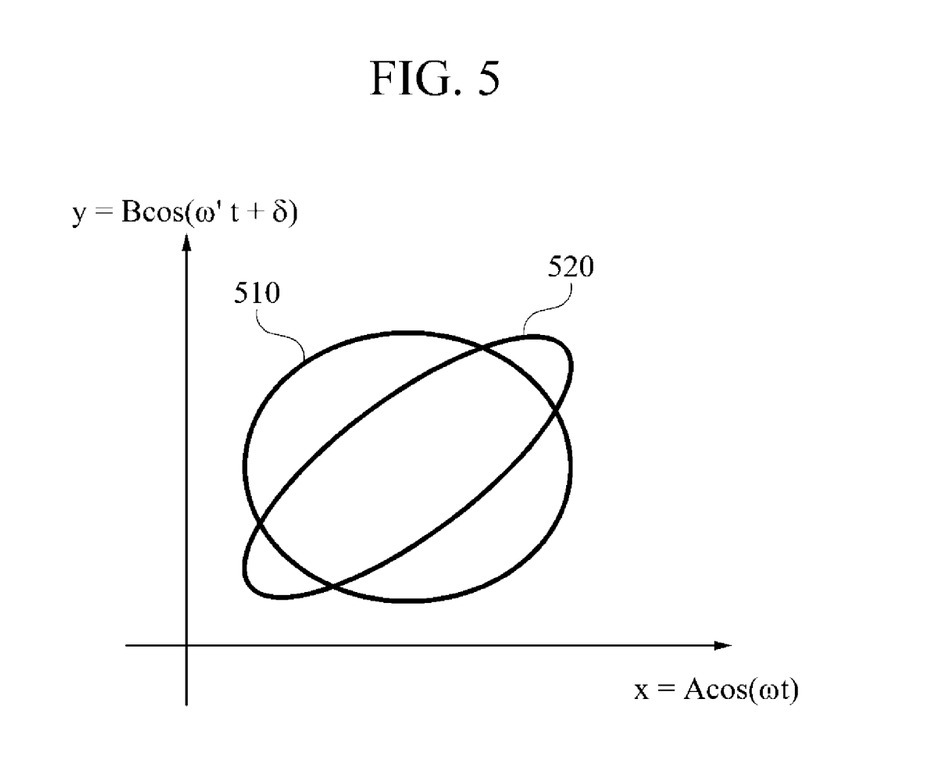
FIG. 5 is a diagram for describing a method for generating a Lissajous figure according to an embodiment of the technical idea of the present disclosure.

FIG. 5 is a diagram for describing a method for generating a Lissajous figure according to an embodiment of the technical idea of the present disclosure.

Referring to FIG. 5, the Lissajous figure is a figure that appears when observing the mixing of two wavelengths with an oscilloscope, and directs different pulses to an x-axis and a y-axis. Herein, the x-axis may be represented as $x=A \cos(\omega t)$, and the y-axis may be represented as $y=B \cos(\omega' t + \delta)$. At this time, when $\omega$ is equal to (=) $\omega'$, and a phase difference $\delta$ is 90 degrees, the Lissajous figure appears as a 'circle'.

In one embodiment, when transforming the three U, V and W phases into the d-q axes, in a normal case, the d-axis component and the q-axis component have a phase difference of 90 degrees, such that the Lissajous figure will appear as a circle 510. However, when an abnormality occurs in the driving unit or motor related to the operation of the robot, the phase of each signal is changed and the Lissajous figure will appear as a FIG. 520 subjected to arbitrary deformation, not the circle 510. Accordingly, the robot status determination apparatus may determine the status of the robot based on the Lissajous figure.

Returning again to the description of FIG. 2, when the first comparison result is the threshold value or more, the robot status determination apparatus may DQ transform the three-phase current or voltage input to the motor related to the operation of the robot, and then generate a Lissajous figure to determine the status of the robot.

In step 250, the robot status determination apparatus may compare the generated Lissajous figure with the reference Lissajous figure to acquire a second comparison result. In one embodiment, as reviewed in FIG. 5, the reference Lissajous figure may appear as the circle 510. In step 220, the resonance frequency should be measured and compared in the process of performing the same motion by the robot. However, in step 250, as reviewed in FIG. 5, the Lissajous figure, that is, the reference Lissajous figure will be indicated as the circle 510, such that there is no need to generate a Lissajous circle in the process of performing the same motion by the robot. But, this is only an example, and there may be a case in which a more accurate result can be acquired by creating the Lissajous circle in the process of performing the same motion by the robot.

In one embodiment, the second comparison result may be represented as a difference between the circle 510 which is a reference Lissajous figure and the generated Lissajous circle, and this difference may be indicated as a similarity, an area where the circle 510 which is the reference Lissajous figure and the generated Lissajous circle are overlapped with each other. However, this is only an example, and this difference may be represented in various ways without limitation thereof.

In step 260, the robot status determination apparatus may determine the robot status based on the first comparison result and the second comparison result. In one embodiment, when it is determined that the second comparison result is the threshold value or more, it may be determined that the robot is in an abnormal status. In this case, it may be referred to the first comparison result.

As described above, according to an embodiment, when the first comparison result is greater than the threshold value in step 240, the robot status determination apparatus may perform additional analysis, that is, steps 240 to 260 to more accurately determine the status of the robot. However, this is only an embodiment, and the robot status determination apparatus may perform steps 210 to 230 and steps 240 to 260 in parallel to determine the status of the robot. Furthermore, it is also possible to perform steps 240 to 260 first, and additionally perform steps 210 to 230 according to the results.

According to an embodiment, in accordance with the method and apparatus for determining the status of a robot, it is possible to more objectively and accurately determine the status of the robot by using the above-described robot status determination method. Furthermore, it is possible to determine the status of the robot, without having to stop the robot, that is, the equipment, and proceed with a separate diagnosis process using use special equipment or tools, and objectively determine the status of the robot and predict the life-time of the robot.

Figure 6:
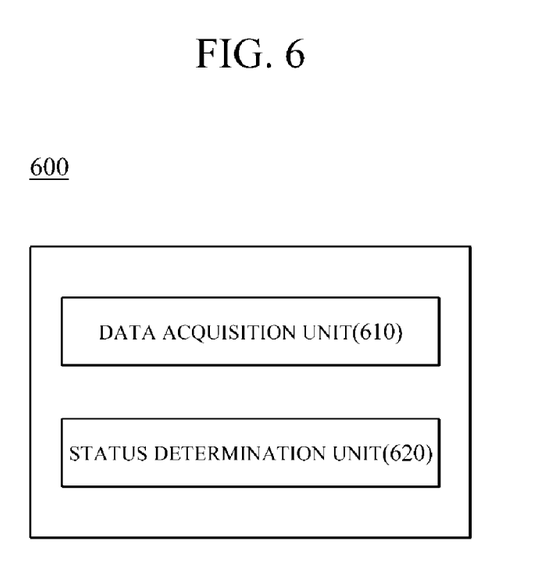
FIG. 6 is a block diagram illustrating an internal configuration of an apparatus for determining the status of a robot (hereinafter, also referred to as a 'robot status determination apparatus') according to an embodiment of the technical idea of the present disclosure.

FIG. 6 is a block diagram illustrating an internal configuration of the robot status determination apparatus according to an embodiment of the technical idea of the present disclosure.

Referring to FIG. 6, a robot status determination apparatus 600 according to an embodiment of the present disclosure may include a data acquisition unit 610 and a status determination unit 620 depending on the hardware configuration thereof. However, this is only an example, and the configuration of the robot status determination apparatus 600 is not limited thereto. For example, the robot status determination apparatus 600 may further include another configuration, or may not include some of the configurations disclosed in FIG. 6.

The data acquisition unit 610 may acquire first data and second data related to the operation of the robot. In one embodiment, the first data related to the operation of the robot may include data on the torque of the motor related to the operation of the robot, the velocity and position of the driving unit, etc., and the second data related to the operation of the robot may include data on the three-phase current or voltage input to the motor related to the operation of the robot.

In one embodiment, the data acquisition unit 610 may include a torque sensor, a velocity sensor, an acceleration sensor, an optical sensor, an infrared sensor, a tilt sensor, a GPS receiver, a voltmeter, an ammeter and the like. However, the sensors described above are only an example, and the data acquisition unit 610 may acquire data using various sensors without limitation thereof. In one embodiment, the data acquisition unit 610 may update the reference resonance frequency through iterative learning for the operation of the robot.

The status determination unit 620 may determine the status of the robot by analyzing the operation of the robot based on the first data and the second data. In one embodiment, the status determination unit 620 may acquire a resonance frequency by analyzing the operation of the robot in the frequency region based on the first data related to the operation of the robot, and compare the acquired resonance frequency with the reference resonance frequency to acquire a first comparison result. In one embodiment, the status determination unit 620 may perform fast Fourier transform (FFT) on a torque change of the motor related to the operation of the robot on the basis of data on the torque of the motor related to the operation of the robot to acquire at least one resonance frequency component for the operation of the robot. In this case, the status determination unit 620 may determine the section to perform the FFT with respect to the torque change of the motor related to the operation of the robot on the basis of data on the velocity and position of the driving unit related to the operation of the robot.

Thereafter, if the first comparison result is equal to or greater than the threshold, based on the second data related to the operation of the robot, the three-phase signal is DQ-transformed to generate a Lissajous figure, and the generated Lissajous figure is compared with the reference Lissajous figure to acquire a second comparison result, thereby the status of the robot may be determined based on the first comparison result and the second comparison result. In one embodiment, the status determination unit 620 may DQ transform the three-phase current or voltage input to the motor related to the operation of the robot to transform it into a d-axis component and a q-axis component, and generate a Lissajous figure based on the d-axis component and the q-axis component.

Further, although not shown in FIG. 6, the robot status determination apparatus 600 may further include a storage unit, a memory, an output unit, a display unit, a user input unit and the like.

The storage unit or the memory may store various data, programs, or applications for driving and controlling the robot status determination apparatus 600. The storage unit or the memory may store the first data and the second data acquired by the data acquisition unit 610.

The output unit is intended to generate an output related to sight, hearing, and vibration, etc., and may include a display unit, a sound output unit, a motor and the like.

The display unit may include a display module. The display module may include a display panel, a display driving unit, and a touch panel.

The user input unit generates input data for the user to operate the apparatus. The user input unit may include a keypad, a dome switch, a (static pressure/capacitive) touch pad, a jog wheel, a jog switch and the like.

Figure 7:
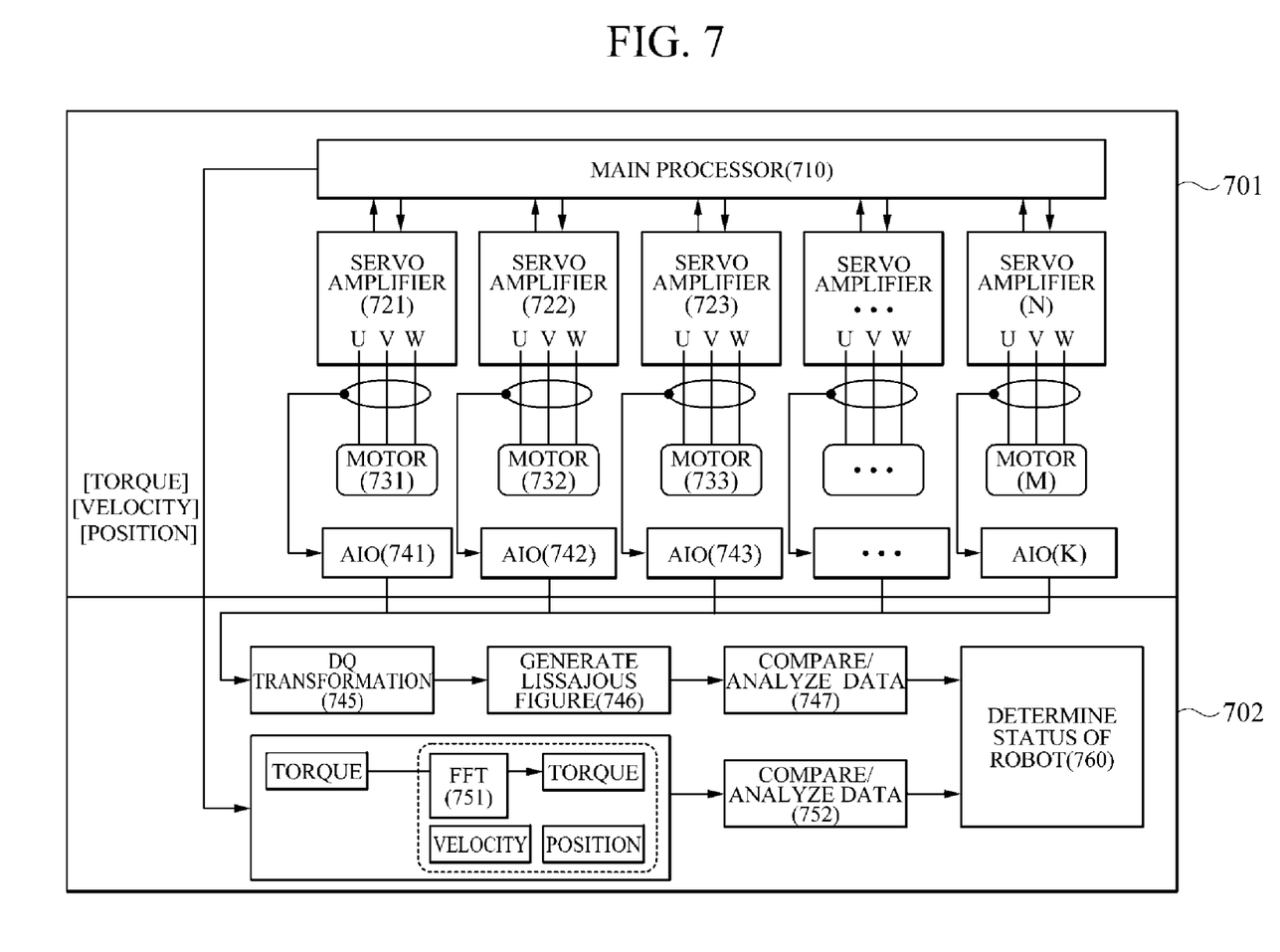
FIG. 7 is a block diagram for describing a process of determining the status of a robot according to an embodiment of the technical idea of the present disclosure.

FIG. 7 is a block diagram for describing a process of determining the status of a robot according to an embodiment of the technical idea of the present disclosure.

Referring to FIG. 7, a block 701 includes components related to the operation of the robot, and a block 702 indicates the process of determining the status of a robot. Referring to the block 701, the robot may include a main processor 710 configured to control an entire operation of the robot, a plurality of motors 731, 732, 733 . . . and M and a plurality of servo amplifiers 721, 722, 723 . . . and N for supplying a power to the motors 731, 732, 733 . . . and M thereof. The plurality of motors 731, 732, 733 . . . and M are respectively connected to the driving unit of the robot, and may receive the power from the plurality of servo amplifiers 721, 722, 723 . . . and N under the control of the main processor 710, and provide a kinetic energy to the driving unit so as to move the same. Herein, the number of servo amplifiers and the number of motors may be the same, or one or more motors may be connected to one servo amplifier.

The robot status determination method according to an embodiment is a method for determining the status of a robot during operating the robot as described above. Referring to the block 702, the robot status determination apparatus may acquire torque, velocity, and position data measured by sensors through the main processor 710, and acquire a three-phase signal measured from a power line connected to the motor through AIOs 741, 742, 743 . . . and K.

The robot status determination apparatus may perform FFT on the torque signal with reference to the velocity and position data (751) to acquire a resonance frequency by analyzing the torque signal in terms of the frequency. The apparatus may compare the acquired resonance frequency as described above with the reference resonance frequency (752) to determine the status of the robot (760). In addition, the apparatus may perform DQ transformation on the three-phase signal (745) to generate a Lissajous FIG. 746), and compare the reference Lissajous figure with the generated Lissajous FIG. 747) to determine the status of the robot (760).

In one embodiment, for these two analysis processes, any one analysis process is performed first, and the other analysis process may be performed depending on the result, and it is also possible to determine the status of the robot by performing the two analysis processes in parallel.

According to an embodiment, in accordance with the method and apparatus for determining the status of a robot, it is possible to more objectively and accurately determine the status of the robot by using the above-described robot status determination method. Furthermore, it is possible to determine the status of the robot, without having to stop the robot, that is, the equipment, and proceed with a separate diagnosis process using use special equipment or tools, and objectively determine the status of the robot and predict the life-time of the robot.

The robot status determination method according to an embodiment may be implemented in a form of a program command that can be executed through various computer means to be recorded in a computer readable medium. The computer readable medium may include program commands, data files, data structures, and the like alone or in combination thereof. The program commands recorded in the medium may be specially designed and configured for the present invention, or may be publicly known to and used by those skilled in the software field. Examples of the computer readable recording medium include magnetic media such as hard disks, floppy disks and magnetic tapes, optical media such as CD-ROMs and DVDs, magneto-optical media such as floppy disks, and a hardware device which is specifically configured to store and perform the program command such as a ROM, a RAM, a flash memory and the like. Examples of the program command includes a high-level language code executable by a computer using an interpreter, and the like, as well as a machine language code created by a compiler.

In addition, a system for providing a service type function according to the disclosed embodiments or an operation method for the system may be provided by being included in a computer program product. The computer program product may be traded between sellers and buyers as goods.

The computer program product may include an S/W program and a computer readable storage medium in which the S/W program is stored. For example, the computer program product may include goods (e.g., downloadable apps) in a form of S/W programs distributed electronically through manufacturers of electronic devices or electronic markets (e.g., Google Play Store, App Store). For electronic distribution, at least a portion of the S/W program may be stored in a storage medium or may be temporarily created. In this case, the storage medium may be a server of the manufacturer, a server of the electronic market, or a storage medium of a relay server temporarily storing the SW program.

In a system consisting of the server and a client device, the computer program product may include a storage medium of the server or a storage medium of the client device. Alternatively, when there is a third device (e.g., a smart phone) which is communicatively connected to the server or the client device, the computer program product may include a storage medium of the third device. Alternatively, the computer program product may include the S/W program itself which is transmitted from the server to the client device or the third device, or transmitted from the third device to the client device.

In this case, one of the server, the client device and the third device may execute the computer program product to perform the method according to the disclosed embodiments. Alternatively, two or more of the server, the client device, and the third device may execute the computer program product to execute the method according to the disclosed embodiments in a distributed manner.

For example, a server (e.g., a cloud server or an artificial intelligence server) may execute the computer program product stored in the server to control the client device communicatively connected with the server so as to perform the method according to the disclosed embodiments.

Although the embodiments have been described in detail above, the scope of the present invention is not limited to the embodiments, and various modifications and improvements by those skilled in the art using the basic concept of the present invention as defined in the following claims are also included in the scope of the present invention.

What is claimed is:

1. A method for determining the status of a robot, the method comprising:
   acquiring first data and second data related to an operation of the robot;
   acquiring a resonance frequency by analyzing the operation of the robot in a frequency region based on the first data related to the operation of the robot;
   acquiring a first comparison result by comparing the acquired resonance frequency with a reference resonance frequency;
   when the first comparison result is a threshold value or more, generating a Lissajous figure by DQ transforming a three-phase signal based on the second data related to the operation of the robot;

acquiring a second comparison result by comparing the generated Lissajous figure with a reference Lissajous figure; and determining the status of the robot based on at least one of the first comparison result and the second comparison result.

2. The method according to claim 1, wherein the first data related to the operation of the robot comprises data on a torque of a motor, a velocity and a position of a driving unit related to the operation of the robot.

3. The method according to claim 2, wherein the acquiring of the resonance frequency comprises performing fast Fourier transform (FFT) on a torque change of the motor related to the operation of the robot on the basis of data on the torque of the motor related to the operation of the robot to acquire at least one resonance frequency component for the operation of the robot.

4. The method according to claim 3, wherein the acquiring of the resonance frequency comprises determining a section to perform the FFT with respect to the torque change of the motor related to the operation of the robot on the basis of data on the velocity and position of the driving unit related to the operation of the robot.

5. The method according to claim 2, wherein the determining of the status of the robot comprises determining the status of the robot in an operation process of the robot on the basis of data on the velocity and position of the driving unit related to the operation of the robot.

6. The method according to claim 1, wherein the second data related to the operation of the robot comprises data on a three-phase current or voltage input to the motor related to the operation of the robot.

7. The method according to claim 6, wherein the DQ transforming of the three-phase signal comprises:

DQ transforming the three-phase current or voltage input to the motor related to the operation of the robot to acquire a d-axis component and a q-axis component; and generating the Lissajous figure based on the acquired d-axis component and the q-axis component.

8. The method according to claim 1, further comprising updating the reference resonance frequency through iterative learning for the operation of the robot.

9. A apparatus for determining the status of a robot, the apparatus comprising:

a data acquisition unit configured to acquire first data and second data related to an operation of the robot; and a status determination unit configured to acquire a resonance frequency by analyzing the operation of the robot in a frequency region based on the first data related to the operation of the robot, acquire a first comparison result by comparing the acquired resonance frequency with a reference resonance frequency, when the first comparison result is a threshold value or more, generate a Lissajous figure by DQ transforming a three-phase signal based on the second data related to the operation of the robot, acquire a second comparison result by comparing the generated Lissajous figure with a reference Lissajous figure, and determine the status of the robot based on at least one of the first comparison result and the second comparison result.

10. The apparatus according to claim 9, wherein the first data related to the operation of the robot comprises data on a torque of a motor, a velocity and a position of a driving unit related to the operation of the robot.

11. The apparatus according to claim 10, wherein the status determination unit performs fast Fourier transform (FFT) on a torque change of the motor related to the operation of the robot on the basis of data on the torque of the motor related to the operation of the robot to acquire at least one resonance frequency component for the operation of the robot.

12. The apparatus according to claim 11, wherein the status determination unit determines a section to perform the FFT with respect to the torque change of the motor related to the operation of the robot on the basis of data on the velocity and position of the driving unit related to the operation of the robot.

13. The apparatus according to claim 10, wherein the status determination unit determines the status of the robot in an operation process of the robot on the basis of data on the velocity and position of the driving unit related to the operation of the robot.

14. The apparatus according to claim 9, wherein the second data related to the operation of the robot comprises data on a three-phase current or voltage input to the motor related to the operation of the robot.

15. The apparatus according to claim 14, wherein the status determination unit DQ transforms the three-phase current or voltage input to the motor related to the operation of the robot to acquire a d-axis component and a q-axis component, and generate a Lissajous figure based on the acquired d-axis component and the q-axis component.

16. The apparatus according to claim 9, wherein the data acquisition unit updates the reference resonance frequency through iterative learning for the operation of the robot.

* * * * *